United States Patent

Marshall et al.

[11] Patent Number: 5,846,324
[45] Date of Patent: Dec. 8, 1998

[54] SEASONING SPREADER

[75] Inventors: Kenneth M. Marshall; Robert A. Krynock, both of Indiana, Pa.

[73] Assignee: FMC Corporation, Chicago, Ill.

[21] Appl. No.: 800,817

[22] Filed: Feb. 14, 1997

[51] Int. Cl.[6] .................................................. A23G 3/00
[52] U.S. Cl. .............................. 118/19; 118/22; 118/417; 118/418
[58] Field of Search .............................. 118/19, 22, 417, 118/418; 222/196, 199, 189.05, 189.02; 209/314, 354, 920; 366/154.2; 99/494; 426/289

[56] References Cited

U.S. PATENT DOCUMENTS

| | | | |
|---|---|---|---|
| 2,329,333 | 9/1943 | Carter | 209/314 |
| 3,155,853 | 11/1964 | Spurlin et al. | 310/29 |
| 4,356,911 | 11/1982 | Brown | 198/766 |
| 4,455,496 | 6/1984 | Dean et al. | 310/29 |
| 4,543,907 | 10/1985 | Fowler | 119/19 |
| 4,569,446 | 2/1986 | Kelley | 209/920 |
| 4,673,833 | 6/1987 | Dean et al. | 310/29 |
| 4,701,647 | 10/1987 | Dean et al. | 310/29 |
| 4,719,376 | 1/1988 | Dean et al. | 310/29 |
| 5,090,593 | 2/1992 | Ejike | 118/19 |
| 5,287,027 | 2/1994 | Marshall et al. | 310/21 |
| 5,293,987 | 3/1994 | Marshal et al. | 198/769 |
| 5,386,939 | 2/1995 | Ruegg | 118/19 |
| 5,401,534 | 3/1995 | Bourreau | 118/418 |

OTHER PUBLICATIONS

FMC Corporation, *Syntron Light–Capacity Electromagnetic Vibrating Feeders,* 1994 20 pages, Homer City, PA USA.
FMC Corpration, *Syntron BF–4 Scale Feeder,* No Date, 2 pages, Homer City, PA, USA.

*Primary Examiner*—Laura Edwards
*Attorney, Agent, or Firm*—Rockey, Milnamow & Katz, Ltd.

[57] ABSTRACT

An apparatus and process for coating food products with seasoning, powder or other dry or granulated material while the food products are rotated in a drum uses a trough which extends into the drum from outside of the drum. The trough provides a plurality of V-shaped channels having intermittently arranged lengthwise slots along low points of the channels for creating curtains of material falling through the slots onto the food products. The trough is vibrated for inducing flow along its length as well as for preventing clogging of material flowing through the slots. Alternately the material can spill over a tapered wall of the trough rather than through slots. A vibrating inlet feeder which provides a screening surface is located upstream of the trough for screening the material before discharge into the trough and eventual discharge into the drum. A controlled screw feeder can be used to limit and regulate flow of material into the inlet feeder.

23 Claims, 6 Drawing Sheets

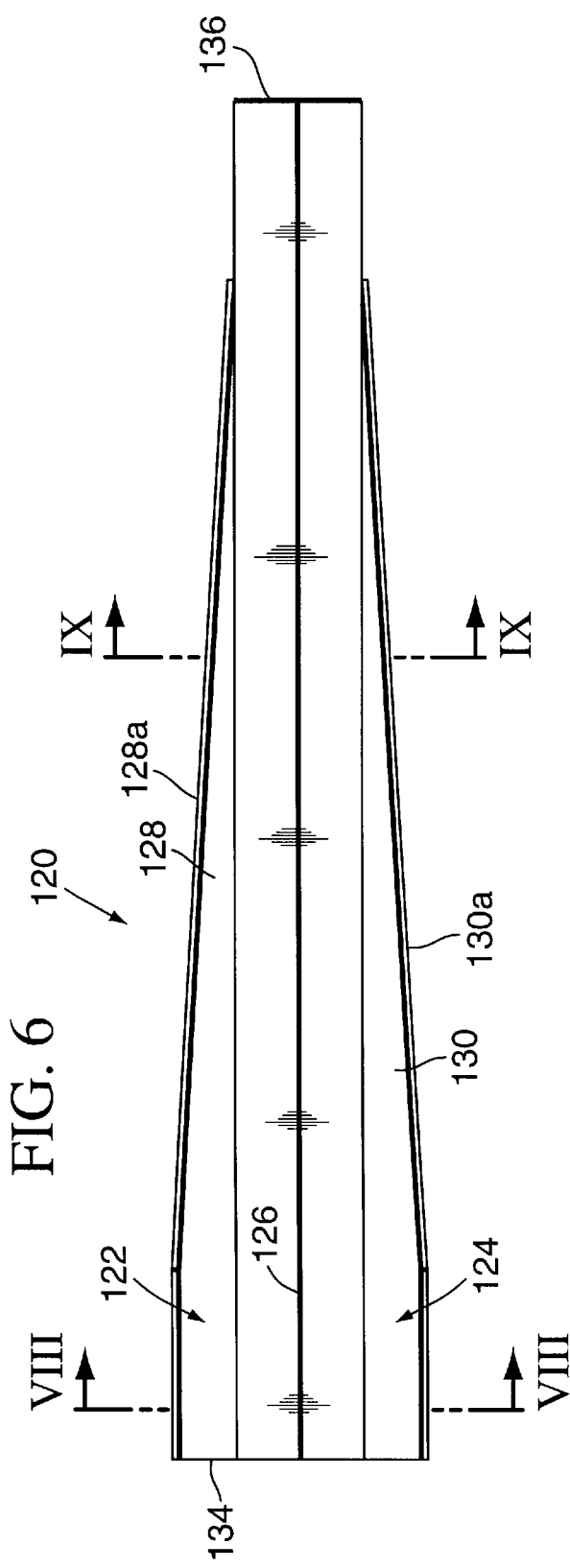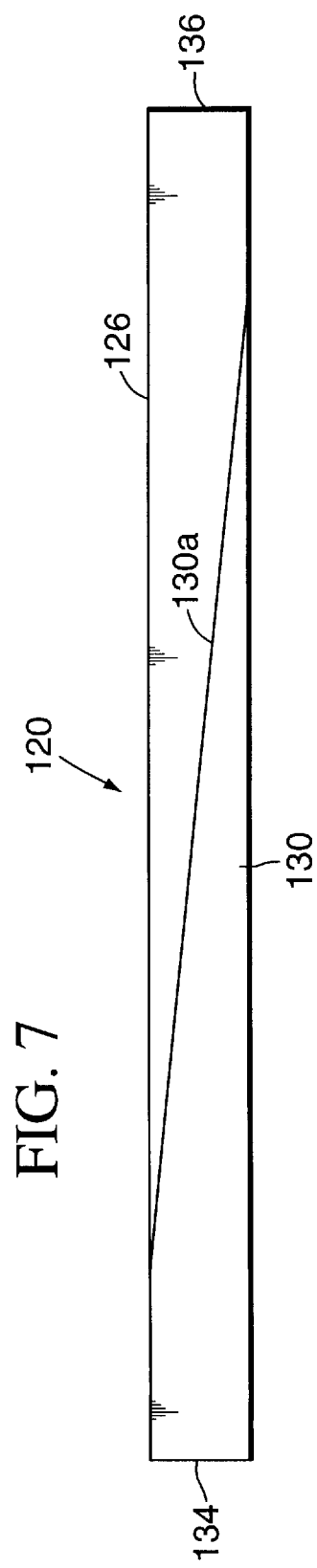

SEASONING SPREADER

FIELD OF THE INVENTION

The present invention relates to an apparatus and method for applying granular material to food products, and particularly to applying a thin, even film of seasonings, spices and the like to snack foods.

BACKGROUND OF THE INVENTION

Many snack foods such as potato chips, extruded snacks, nachos, etc., are flavored with spices and/or other seasoning, hereinafter referred to generally as "seasoning." The application of the seasoning is accomplished with the use of a device referred to as a "flavoring drum," which is a barrel-like container that rotates about an axis which is tilted relative to a horizontal axis. The snack food product to be coated by the seasoning is fed into an elevated open end of the flavoring drum by a weigh conveyor, i.e., a conveyor which is closely controlled to control the rate of material being transported thereby.

A seasoning feeder, extending horizontally into the drum produces a discharge of seasoning that is applied to the surface of the product in the drum. As the flavoring drum rotates, the product is caused to rotate and thereby mix with the seasoning, to advantageously obtain an even coating of the seasoning on all surfaces of the product. As the snack food product moves through the drum, friction, and/or baffles located on an interior of the drum wall, move the product circumferentially up the circular wall of the drum which promotes a mixing action of the product within the drum. Gravity causes the product to pass to a discharge open end of the drum to be discharged from the drum and collected on a take-away conveyor.

The application of seasoning in the abovedescribed apparatus has posed problems for snack food manufacturers. The seasoning is often a hygroscopic powder which is affected by moisture and temperature, and if the powder is applied through nozzles and slits, the powder has a tendency to agglomerate and plug up or bridge over the nozzles and slits requiring a clean-up operation to ensure operation of the apparatus.

Additionally, if the snack food product is too dry, the seasoning may not adhere to the surface of the snack food product, and if too moist, there may be an excess accumulation of seasoning on some of the snack food product. Therefore, in realizing these conditions, a seasoning feed device which promotes a more even distribution of the seasoning within the drum would be advantageous.

The seasonings typically used for snack food products also tend to adhere and build up on contact surfaces of the apparatus, which increases the need for clean-up and sanitation control. Additionally, seasoning can be the most expensive ingredient in the product, requiring special attention to this part of the snack food manufacturing process to reduce costs and conserve ingredients.

In a known apparatus and process for applying seasoning to snack food products, the seasoning is applied by way of a screw conveyor feed system. The system includes a screw feeder generally positioned so that it extends into a discharge end of a flavoring drum for a distance, close to a center line of the drum. The seasoning is placed in a supply hopper located above an inlet to the screw feeder. The seasoning flows by gravity into a screw feeder inlet. As the screw feeder turns, the seasoning is forced along a bottom of the screw feeder enclosure between flights of the screw feeder, and is also forced through fine slits or nozzles to sprinkle on the food product as the food product rotates in the flavoring drum.

This known arrangement is difficult to clean and maintain in order to meet the sanitary requirements and standards of the food processor. The action of the screw feeder often tends to pack the seasoning while being fed, and seasoning can build up within the screw feeder and externally of the screw feeder housing, such that it is necessary to clean the apparatus with increased frequency. Additionally, the build-up of waste seasoning on and around the apparatus represents a significant additional material cost to the food processor.

In response to an increasing demand for more snacks which are perceived by the public to be more compatible with healthy eating, food processors have introduced low fat snack foods that are baked rather than deep-fried. However, baked food products have a tendency to be more friable than fried food products, such that breakage of food products during processing is more likely. Thus, the rotating flavoring drum can be a source of product damage. Reducing the amount of time food product is retained in the flavoring drum or eliminating the flavoring drum altogether can reduce product damage.

One way to reduce retention time within the flavoring drum is to make the drum shorter in an axial direction. However, if the drum is made shorter, the required amount of seasoning to coat the product must be introduced into the drum more quickly. Consequently, the current screw conveyor feed system which provides a single discharge of seasoning, cannot accommodate the required product capacity.

The space constraints of the flavoring drum make the use of multiple screw conveyors impractical, and also the cost of such a system would be prohibitive.

SUMMARY OF THE INVENTION

According to the invention, an apparatus and process for coating food products with granular, dry or powdered material, such as for coating a snack food product with seasoning, is provided which delivers multiple curtains of the material falling into a rotating drum which carries the food product. An apparatus and process for coating food products with granular material is provided which avoids the build-up of granular material as waste material. The apparatus of the present invention is resistant to an accumulation of the granular material and is thus also more easily maintained, requiring less frequent cleaning. This is achieved by the provision of a vibratory trough which extends into the associated rotating drum, with the trough defining at least one edge from which an elongated curtain of granular material is discharged.

The apparatus and process of the invention includes a weigh conveyor for delivering a controlled amount of granular material to a screw feeder, and an inlet screening mechanism receiving the granular material from the screw feeder for removing agglomerated granulated material or other large particles or objects. The apparatus delivers the granular material into a rotating flavoring drum through an elongate trough having slots for allowing granular material to fall onto the food product within the flavoring drum. The trough is vibrated to progress the granular material and to assist in keeping any discharge slots or holes free of agglomerated granular material.

The apparatus can deliver seasoning to the flavoring drum and dispense a large capacity of seasoning in multiple uniform curtains to meet a requirement of short-length flavoring drums while providing an easy-to-clean, open construction that prevents packing of the seasoning and which is less prone to bind or plug the discharge openings. The shorter length flavoring drums are advantageous to prevent excessive breakage of snack foods, particularly baked snack foods which can be more friable than deep-fried snack foods.

In one embodiment of the invention, two vibratory feeders are used, including an inlet screening feeder which delivers seasoning or powder into a discharge vibratory feeder in a cascade fashion. The inlet feeder is fed from a metering device that outputs granular material at a given rate, set by the amount of food product being fed into the flavoring drum at any given time. The food product may be fed by a weigh belt or the like, that provides an output signal to the metering device that is proportional to the amount of food product entering the flavoring drum. The inlet feeder contains a screening deck that removes agglomerated seasoning lumps or other large particles. The throughput of the inlet feeder is then fed onto the discharge feeder. The large particles left on the screen deck of the inlet feeder feed into a "blind end" or closed end of the screen deck through structure where the large particles can rotate due to the feeding action. Abrading on the screen deck during rotation removes fines from the large particles or agglomerated lumps, and assists in reducing in size, or eliminating, the large particles or lumps.

The trough of the discharge feeder extends into the discharge end of the flavoring drum and spans a distance within the drum to a point close to the inlet end of the drum. The trough of the discharge feeder allows for multiple curtains of granular material such as seasoning. In a first embodiment, a bottom of the trough is formed into a series of parallel "V" shaped folds, such that two or more valleys are formed along the entire length of the trough. Narrow slits are cut through a bottom of each valley to allow seasonings to pass through the trough and into the drum. Additionally, since the seasoning is fed by vibration, there is less tendency for the previously screened particles to bridge or plug the slots.

In an alternate embodiment of the trough, two lateral valleys are formed and no slits are cut in the bottom of the valleys. Instead, the trough is tapered such that the outer walls on each side of the trough are tapered to merge into the bottom of the valleys at the discharge end of the trough. In operation, granular material such as seasoning is fed along the trough. The material overflows the edge of the outer walls of the trough as it tapers, providing a curtain of material falling off each edge of the trough along its entire length.

In a further alternate embodiment, only a single vibratory feeder is used, in which case a screening section is added to an inlet end of the vibrating discharge feeder, to perform the function of the inlet feeder as described above.

The invention thus provides an apparatus that can dispense a large capacity of granular material, such as seasoning, at a higher flow rate, in multiple uniform curtains. The apparatus meets the requirement of shorter length flavoring drums while providing an easy-to-clean, open construction that prevents packing of the granular material and which is less prone to bind or plug the discharge openings.

BRIEF DESCRIPTION OF THE DRAWINGS

FIG. 6 is a plan view of a still further alternate embodiment of the trough;

FIG. 7 is a side view of the trough shown in FIG. 6;

DETAILED DESCRIPTION OF THE PREFERRED EMBODIMENTS

Figure 1:
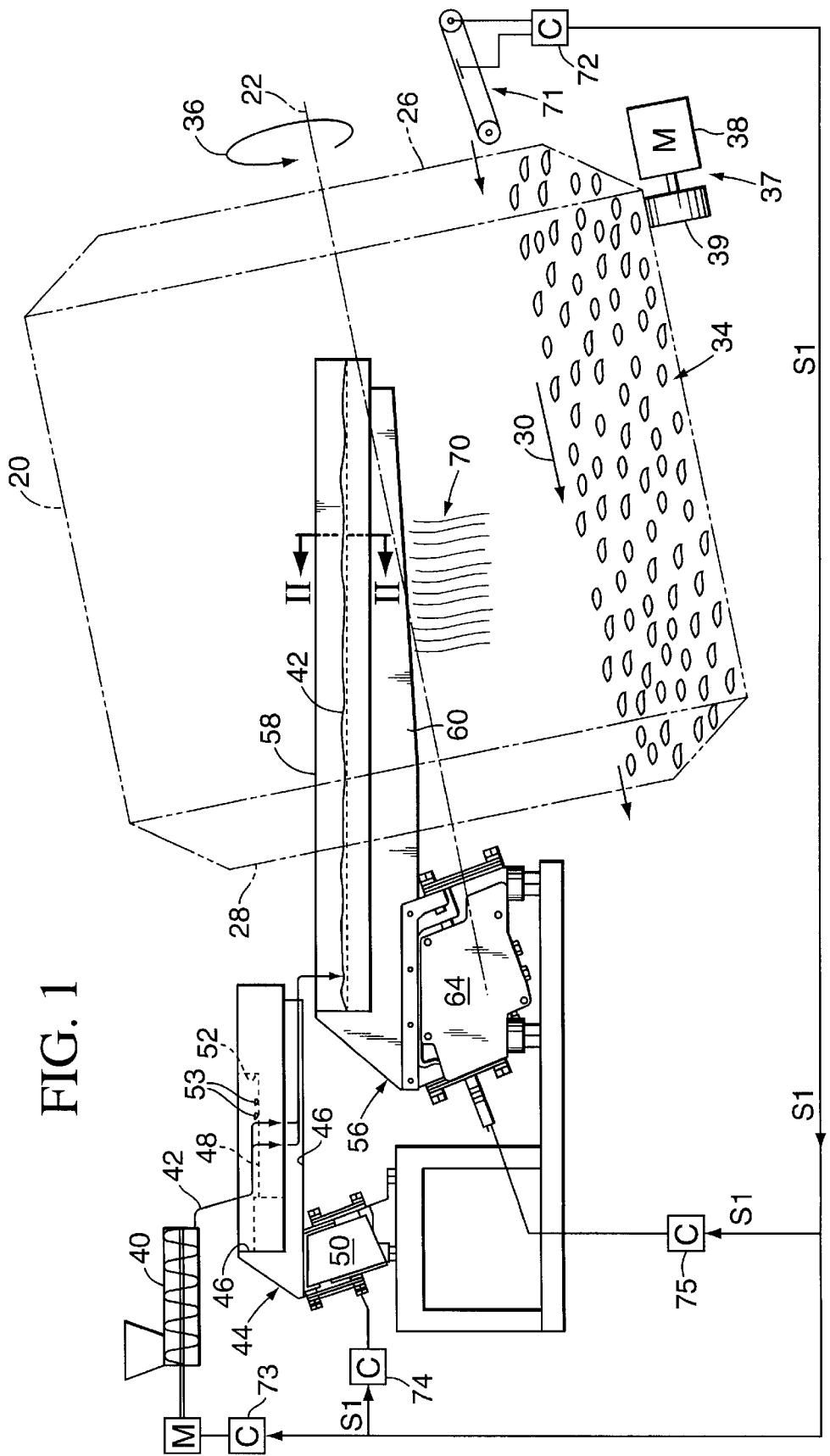
FIG. 1 is a schematic, elevational view of a vibratory granular feeder and food product flavoring drum arrangement according to the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an apparatus for delivering granular material such as seasoning, powder or other dry flowable material into a volume to be mixed with, or coated on, food product material.

Particularly, the figure discloses a food product mixing drum or "flavoring drum" 20 having an axis 22 obliquely arranged to the horizontal. The drum 20 includes an inlet opening 26 and an outlet opening 28 in a direction of product flow 30 through the drum 20. Food products 34 such as snack food, potato chips, nachos, etc., are delivered through the inlet opening 26 and out of the outlet opening 28. The drum 20 is rotated above its axis 22 in the rotary direction 36, by a drive mechanism 37 illustrated schematically as a motor 38 driving a roller 39 which by friction rotates the drum 20. Other mechanisms can also be used such as belt or chain drives, a driven roller supporting the drum on a cradle of rollers, etc. which convert a relatively fast motor speed to a relatively slow drum speed.

Adjacent of the outlet opening 28 is located a granular material feeder system including a screw metering device such as a controlled 300 lbs/hr infeed, such as a screw conveyor feeder 40 which delivers a controlled and metered amount of material 42 into an inlet feeder 44 such as an FMC Electromagnetic Vibratory Feeder Model BF2. The inlet feeder includes a channel 46 having a screen deck 48 arranged thereon. A vibration generator 50 is mechanically connected to the channel 46 to cause vibration thereof. Although an electromagnetic vibration generator is preferred such as described generally in U.S. Pat. Nos. 3,155,853; 4,455,496; 4,673,833; 4,701,647; 4,719,376; 5,287,027; 5,293,987; and 4,356,911, other vibration generators such as eccentric rotating weight vibrators, are encompassed by the present invention. An upstanding wall 52 of the screen 48 creates a "blind end" or closed end of the feeder trough structure where over-sized material such as an illustrated lump 53 passing to the blind end can rotate due to the feeding action. As the over-sized material rotates, the agglomerates abrade on the screen deck 48, and the fines thus produced pass through the screen with the rest of the material 42. Any over-sized particles or lumps 53 left on the screen deck 48 may be removed by hand during regular cleaning periods.

The material which passes through the screen deck 48 passes into the channel 46 and is deposited by gravity from the trough 46 onto a discharge feeder 56 having a trough 58 mounted to a frame 60. The frame 60 is vibrated by a vibration mechanism 64. The discharge feeder may be an FMC Electromagnetic Vibratory Feeder Model BF4. Electromagnetic vibrators are preferred, such as generally described in U.S. Pat. Nos. 3,155,853 4,455,496; 4,673,833; 4,701,647; 4,719,376; 5,287,027; 5,293,987; and 4,356,911, but other type vibrators such as rotating eccentric weight vibrators are also encompassed by the invention. The trough 58 extends substantially throughout the flavoring drum 20 through the open end 28 thereof. If the drum 20 is 60 inches long for example, the length of the feeder trough 58 extending into the drum may be 50 inches.

Figure 2:
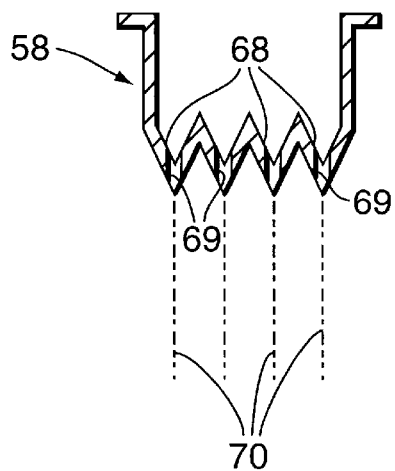
FIG. 2 is a sectional view of a trough taken generally along line II—II of FIG. 1.

The trough 58 is typically formed having a plurality of parallel V-shaped valleys 68 as shown in FIG. 2. The V-shaped valley 68 include holes or slots 69 at distal edges thereof for allowing curtains 70 of material 42 to fall from the slots 69. The curtains 70 fall on the food product material 34 which is mixed and tumbled as the flavoring drum 20 rotates as depicted by the arrow 36.

The screw feeder 40 is a metering device that outputs material 42 at a given-rate, set by the amount of product being fed into the drum 20 at any instance of time. The food product may be fed to the drum 20 by a weigh belt 71 (shown schematically) having a controller 72 or the like, that provides an output signal S1 to the metering device, screw feeder 40, that is proportional to the amount of product entering the drum. A controller 73 on the screw feeder 40 can then adjust the speed thereof so that a proportional amount of granular material 42 is fed to the inlet feeder 44. The two feeders 44, 56 may be set at a feed rate that handles any volume fed by the metering device, or may also speed up and slow down in accordance with the signal S1 from the weighing device 71. For example, controllers 74, 75 for the feeders 44, 56 can adjust the vibratory feed rates thereof in accordance with the signal S1.

Figure 3:
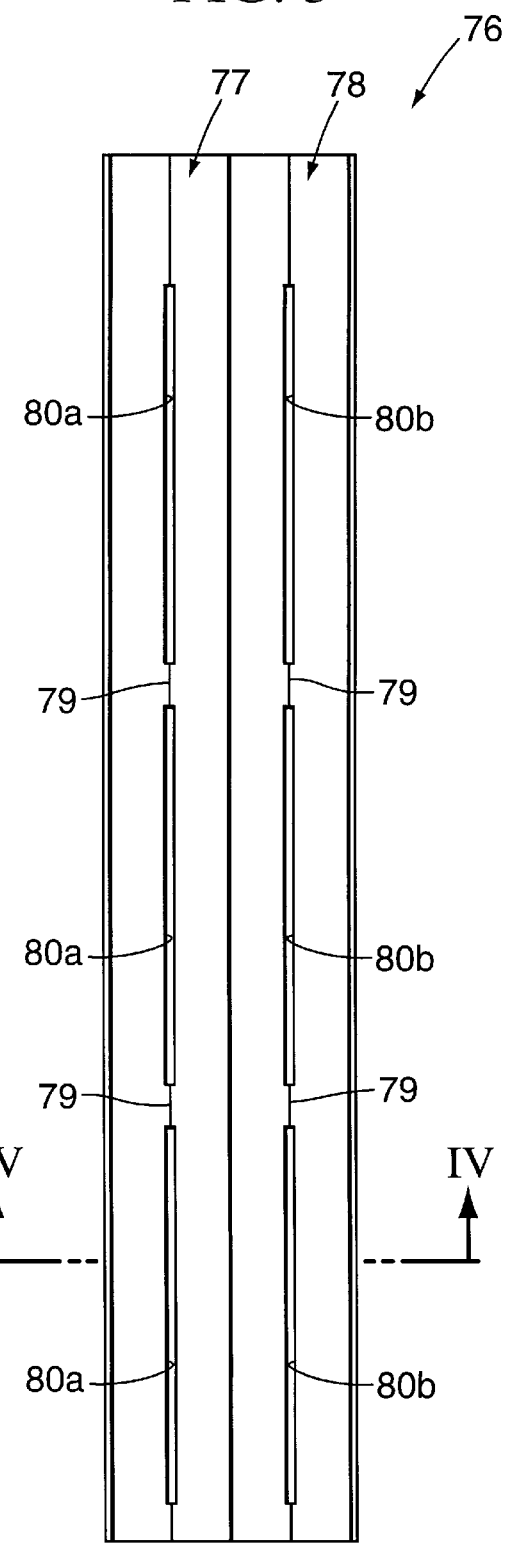
FIG. 3 is a plan view of an alternate embodiment trough having two V-shaped sections.
Figure 4:
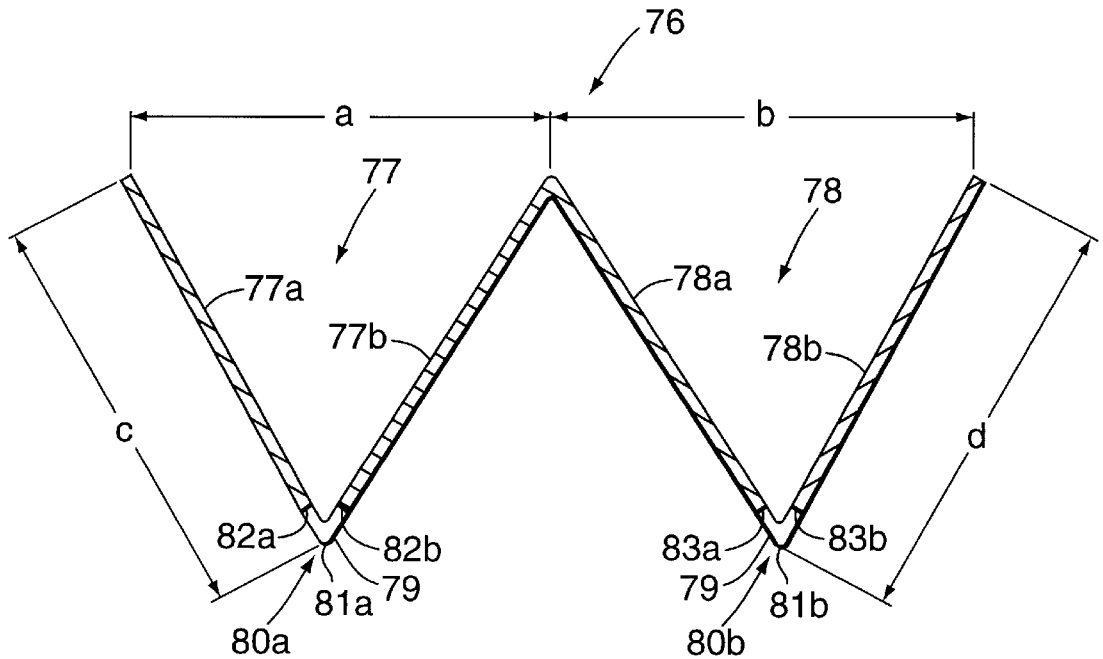
FIG. 4 is a sectional view taken generally along line IV—IV of FIG. 3.

FIGS. 3 and 4 depict an alternate trough 76 to that shown in FIG. 2, using two valleys 77, 78. The alternate trough 76 is advantageously composed of 14 gauge stainless steel with a #4 finish. The trough 76 comprises the left valley 77 and the right valley 78 each of which are defined by a V-shaped wall and have substantial axially arranged slots 80a, 80b arranged each through a bottom apex 81a, 81b of the V-shaped walls. The slots are intermittent along the length of the trough 76 and are separated by folded bridge portions 79 of the V-shaped walls. The slots 80a, 80b are substantially rectangular and defined by slot edges 82a, 82b; 83a, 83b, which locate the curtains 70 of the material flow. Slots through adjacent valleys need not have the same slot width, for example, for a 36 inch long trough with open face dimensions a and b being 1-⅝" and wall dimensions c and d being 1-½", the slot 80a can have a pre-bent width of 0.008" and the slot 80b can have a pre-bent width of 0.018". The width of the slots can be selected to balance distribution of material into the drum 20. Although rectangular slots are shown, shaped slots or holes are encompassed by the invention, including an edge which defines a round hole.

In operation, sufficient "bridging" of material 42 occurs between valley walls 77a, 77b, 78a, 78b, such that material fills the entire bottom of each valley 77, 78 and discharges along the entire length of the trough 76. Since the seasoning 42 is fed along the trough 76 by vibration, there is less of a tendency for the previously screened material to plug the slots 80a, 80b. It is important that the slots 80a, 80b be smooth, accurate and uniform over their entire length. Such qualities can be achieved by the use of a laser burning table to cut the slots.

Figure 5:
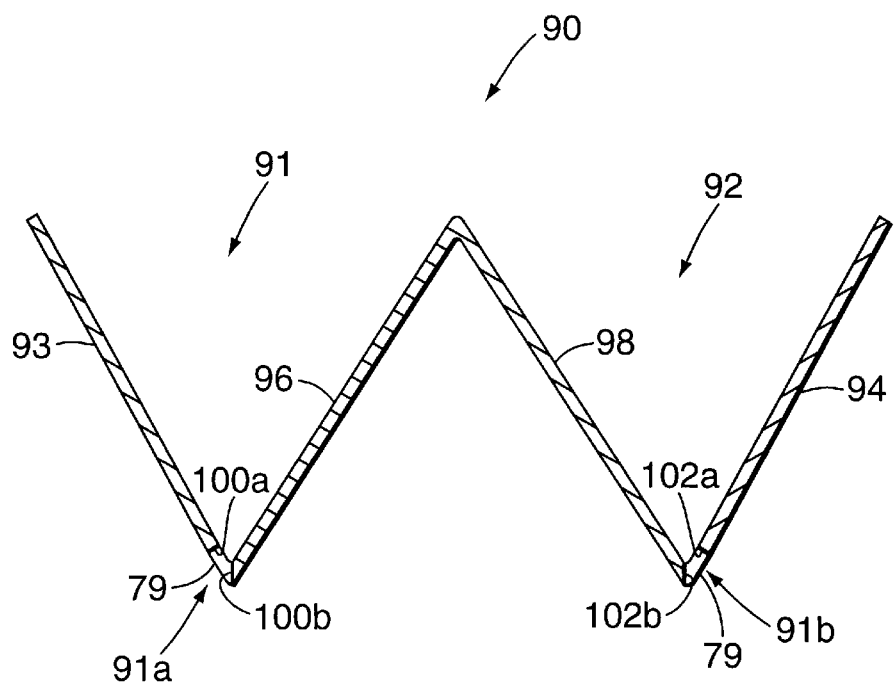
FIG. 5 is an alternate embodiment trough arrangement compared to FIG. 4.
Figure 8:
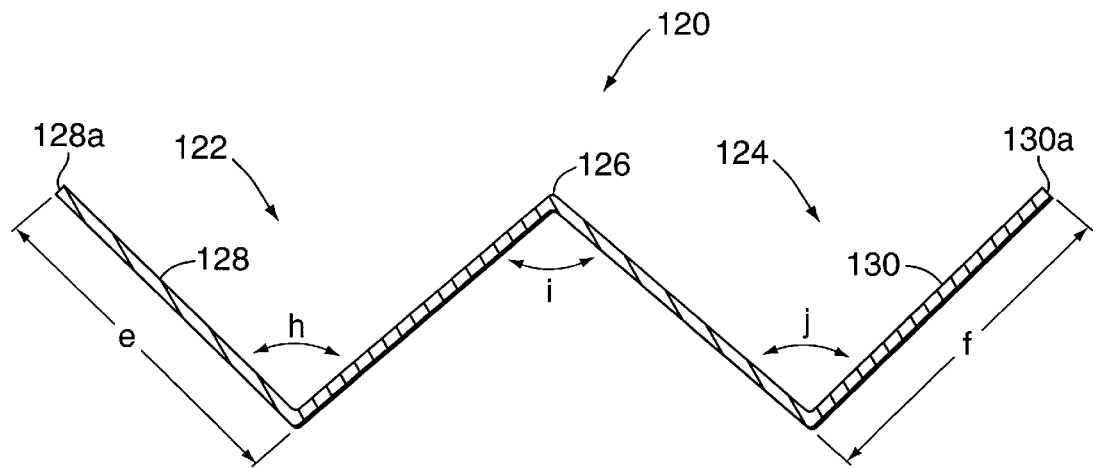
FIG. 8 is a sectional view taken generally along line VIII—VIII of FIG. 6.
Figure 9:
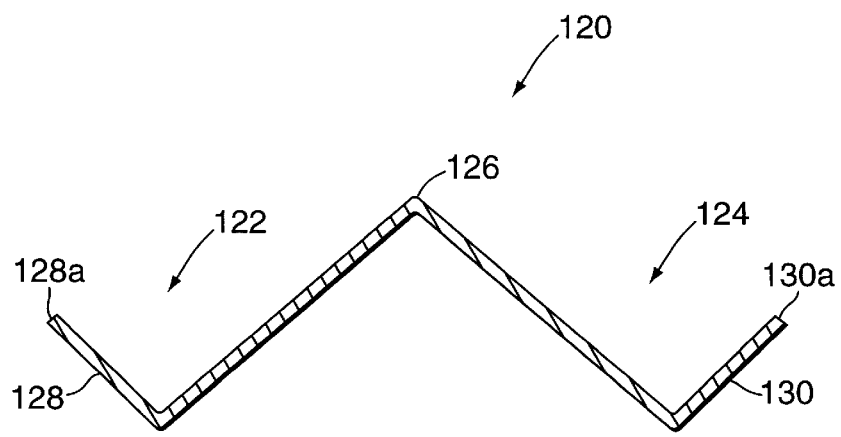
FIG. 9 is a sectional view taken generally along line IX—IX of FIG. 6.

As illustrated in FIG. 5, an alternate trough 90 retains a general W-shape of the trough 76 but the slots 91a, 91b are formed between outer side walls 93, 94 and central walls 96, 98. Since the cuts for the slots 91a, 91b are made prior to folding of the trough side walls 93, 94 from the central walls 96, 98, it facilitates the folding along one edge of the slots 91a, 91b, so that the slots 91a, 91b are actually at the bottom of the side walls 93, 94 on one side of each valley 91, 92. The edges 100a, 100b; 102a, 100b, thus define the location of discharge of curtains 70. This configuration also may better promote an even discharge of the material 42 through the slot 91a, 91b compared to slots 80a, 80b cut exactly through the center of the bottom of the valley as shown in FIG. 4.

FIGS. 6–9 illustrate an alternate trough 120 in plan view. The alternate trough 120 is composed of two parallel V-shaped valleys 122, 124 forming a peak 126 along their intersection. Outside walls 128, 130 of the valleys 122, 124 taper downwardly from a first end 134 to a second end 136. At the first inlet end 134, the outside walls 128, 130 have a height equal to the peak 126. At the second end 136, the outside walls 128, 130 taper down to the lowest elevation of the valleys 122, 124.

As an illustrative embodiment for a 36" long trough, the full width e, f of the outside walls is equal to 1-½" and the angles h, i and j are 90°. The walls 128 taper down to the end 136 to substantially no width.

In operation, as the material 42 is fed along the trough 120, the material 42 overflows the upper edges 128a, 130a of the outside walls 128, 130, providing a curtain of material falling off of each edge 128a, 130a of the trough 120 along its entire length. The edges thus function as weirs to allow spill-over of material from the trough. This type of trough construction is advantageous where the type of material might tend to plug or bridge over a narrow bottom slot.

Figure 10:
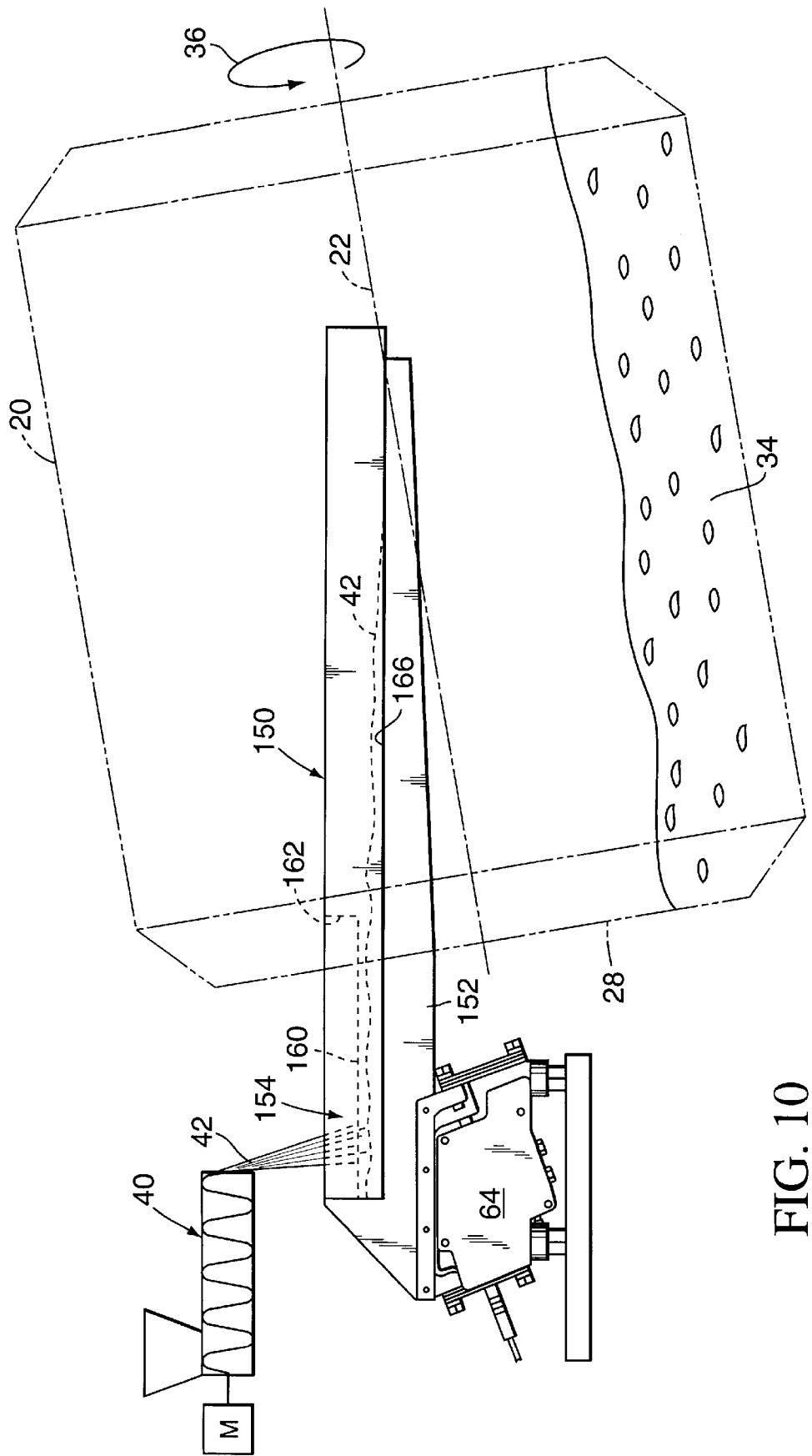
FIG. 10 is a still further alternate embodiment of the present invention wherein an inlet feeder is combined with a vibratory trough.

FIG. 10 shows a further alternate embodiment wherein a trough 150 is vibrated by a trough frame 152 and which includes a screen section 154. The screen section 154 has a substantially horizontally disposed screen deck 160 and a blind wall 162. Material such as seasoning deposited from a screw feeder 40 into the trough 150 is screened by the screen deck 160. Material passing beneath the screen 160 is received into the discharge trough valleys 166 which can be fashioned as any one of the trough embodiments (58, 76, 90, 120) shown in FIGS. 2–9. Material which passes beneath the screen 160 is delivered through the trough valleys 166 and into the drum 20 as previously described. The controls for the screw feeder 40, vibration generator 64 and conveyor 71 described in FIG. 1 can be incorporated also into the embodiment of FIG. 10.

Although FIGS. 1 and 10 illustrate the troughs 58, 150 extending into the drum 20 through the outlet opening 28 it is also encompassed by the invention to insert the troughs through the inlet opening 26 on an opposite axial end of the drum 20.

From the foregoing, it will be observed that numerous modifications and variations can be effectuated without departing from the true spirit and scope of the novel concept of the present invention. It is to be understood that no limitation with respect to the specific embodiment as illustrated is intended or should be inferred. The disclosure is intended to cover by the appended claims all such modifications as fall within the scope of the claims.

The invention claimed is:

1. An apparatus for delivering granular material into a mixing chamber, comprising:

a vibrator having a base for resting on a floor;

an elongate trough supported at one end on said vibrator and extending in cantilever fashion therefrom and sized and adapted for extending inside a mixing chamber said trough having a vertically an supported length extending horizontally from said vibrator and having at least one edge defining a discharge location of granular material falling as a substantial curtain from said unsupported length of said trough, said at least one edge arranged along a length of said unsupported length of said trough and said trough having no interfering structure between said edge and floor which would interfere with said curtain; and said vibrator connected to said trough to vibrate said trough for progressing said granular material along said unsupported length of said trough and inducing discharge of said granular material past said at least one edge.

2. The apparatus according to claim 1 further comprising a screen upstream of said trough, said screen receiving granular material thereon, said screen having a channel arranged below a surface of said screen for receiving screened granular material from said screening surface and said channel arranged to deposit said granular material into said trough.

3. The apparatus according to claim 2 further comprising a vibration device for vibrating said screen.

4. The apparatus according to claim 3 wherein said screen further comprises an upstanding wall for holding agglomerated granular material on a top surface of said screen.

5. The apparatus according to claim 2 wherein said screen is mounted to said trough and said vibrator acts to vibrate both said screen and said trough.

6. The apparatus according to claim 1 further comprising a screw drive for delivering a metered rate of granular material to said trough.

7. The apparatus according to claim 1 wherein said trough comprises at least one elongate valley having a defining wall with a V-shaped cross-section and having a plurality of slots arranged spaced apart along a length of said elongate valley and located at a low position through said defining wall.

8. The apparatus according to claim 1 wherein said trough comprises at least two valleys each having a defining wall with a V-shaped cross-section, each having a plurality of lengthwise slots located along and through a bottom of said defining wall.

9. The apparatus according to claim 1 wherein said trough comprises at least one elongate valley having a defining wall with a V-shaped cross-section, wherein one wall member of said V-shaped defining walls tapers downwardly at a steeper angle than a respective other wall member of said V-shaped defining wall.

10. The apparatus according to claim 1 wherein said trough comprises a substantially W-shaped cross-section.

11. The apparatus according to claim 10 wherein said substantially W-shaped cross-section comprises inner walls which form a peak and outer walls which extend obliquely from said inner walls, said outer walls tapering downwardly along the length of said trough to an elevation below said peak.

12. The apparatus according to claim 1 wherein said trough comprises a W-shaped cross-section composed of a central peak and contiguous lateral valleys, and said valleys comprise lengthwise slots arranged intermittently along the length of said trough at low positions of said valleys.

13. The apparatus according to claim 1, wherein said at least one edge comprises a weir for allowing spillover of said material from said trough.

14. The apparatus according to claim 1 wherein said at least one edge comprises an opening through said trough.

15. The apparatus according to claim 14 wherein said opening comprises an elongated rectangular slot.

16. An apparatus for coating food products with seasoning, comprising:

a drum for holding food products, having an axis, an open inlet end and an open outlet end along said axis, said axis tilted to the horizontal;

drive means for rotating said drum;

an elongate trough extending inside said drum a substantial length between said inlet end and said outlet end, said trough having at least one edge for defining a discharge location of seasoning from said trough; and a vibrator connected to said trough to vibrate said trough for progressing said seasoning along the length of said trough and inducing discharge of said seasoning from said at least one edge.

17. The apparatus according to claim 16 further comprising a screen arranged above an inlet end of said trough, seasoning passing through said screen deposited by gravity into said trough.

18. The apparatus according to claim 17 further comprising a second vibrator connected to said screen to vibrate said screen.

19. The apparatus according to claim 17 wherein said screen is mounted to said trough and said vibrator vibrates said screen and said trough.

20. An apparatus for coating food products with seasoning, comprising:

a drum for holding food products having an open end;

an elongate trough extending inside said drum a substantial length from said open end, said trough having at least one edge for defining a discharge location of seasoning from said trough; and a vibrator connected to said trough to vibrate said trough for progressing said seasoning along the length of said trough and inducing discharge of said seasoning from said at least one edge.

21. The apparatus according to claim 20 further comprising a screen arranged above an inlet end of said trough, seasoning passing through said screen deposited by gravity into said trough.

22. The apparatus according to claim 21 further comprising a second vibrator connected to said screen to vibrate said screen.

23. The apparatus according to claim 21 wherein said screen is mounted to said trough and said vibrator vibrates said screen and said trough.

* * * * *